(12) United States Patent
Zheng et al.

(10) Patent No.: US 12,323,293 B2
(45) Date of Patent: Jun. 3, 2025

(54) METHOD, APPARATUS, AND SYSTEM FOR SENDING CONTROL REQUEST BASED ON KEY VALUE CONFIGURATION

(71) Applicant: Huawei Technologies Co., Ltd., Shenzhen (CN)

(72) Inventors: Haomian Zheng, Dongguan (CN); Italo Busi, Segrate (IT); Chaode Yu, Wuhan (CN)

(73) Assignee: HUAWEI TECHNOLOGIES CO., LTD, Shenzhen (CN)

( * ) Notice: Subject to any disclaimer, the term of this patent is extended or adjusted under 35 U.S.C. 154(b) by 310 days.

(21) Appl. No.: 17/889,635

(22) Filed: Aug. 17, 2022

(65) Prior Publication Data
US 2022/0394010 A1 Dec. 8, 2022

Related U.S. Application Data

(63) Continuation of application No. PCT/CN2020/127353, filed on Nov. 7, 2020.

(30) Foreign Application Priority Data

Feb. 19, 2020 (CN) .......................... 202010101978.2

(51) Int. Cl.
*H04L 41/0806* (2022.01)
*H04L 9/08* (2006.01)
(Continued)

(52) U.S. Cl.
CPC ........ *H04L 41/0806* (2013.01); *H04L 9/0866* (2013.01); *H04L 41/00* (2013.01);
(Continued)

(58) Field of Classification Search
CPC .............. H04L 41/0813; H04L 9/0866; H04L 61/3015
See application file for complete search history.

(56) References Cited

U.S. PATENT DOCUMENTS

| 9,166,863 B2 | 10/2015 | Vermeulen et al. |
| 2007/0156842 A1 | 7/2007 | Vermeulen et al. |
(Continued)

FOREIGN PATENT DOCUMENTS

| CN | 1996308 A | 7/2007 |
| CN | 102055771 A | 5/2011 |
(Continued)

OTHER PUBLICATIONS

Bierman, A. et al., "RESTCONF Protocol," Internet Engineering Task Force (IETF), Request for Comments: 8040, Category: Standards Track, ISSN: 2070-1721, Juniper Networks, Jan. 2017, 137 pages.

(Continued)

*Primary Examiner* — Nam T Tran
(74) *Attorney, Agent, or Firm* — SLATER MATSIL, LLP

(57) ABSTRACT

A method, an apparatus, and a system for sending a control request based on a key value configuration. The method includes generating, by a client controller, a control request, wherein having a plurality of configuration parameters, wherein the plurality of configuration parameters comprise a flexible key value, a control object name, and a universally unique identifier (UUID), where the flexible key value identifies a requested control object, and the flexible key value is determined using at least one of the control object name or the UUID, and sending, by the client controller, the control request to a server controller, where the control request indicates to the server controller to configure the control object.

20 Claims, 6 Drawing Sheets

---

Generate a service request, where the service request includes a plurality of configuration parameters, and the plurality of configuration parameters include a flexible key value, a service name, and a UUID — 310

Send the service request to a server controller, where the service request is used to indicate the server controller to configure a service — 320

(51) Int. Cl.
*H04L 41/00* (2022.01)
*H04L 41/045* (2022.01)
*H04L 41/0813* (2022.01)
*H04L 41/0895* (2022.01)
*H04L 61/3015* (2022.01)

(52) U.S. Cl.
CPC ........ *H04L 41/045* (2022.05); *H04L 41/0813* (2013.01); *H04L 61/3015* (2013.01); *H04L 41/0895* (2022.05)

(56) References Cited

U.S. PATENT DOCUMENTS

| | | | |
|---|---|---|---|
| 2013/0086303 | A1 | 4/2013 | Ludwig et al. |
| 2014/0078930 | A1* | 3/2014 | Bevemyr ............ H04L 41/0813 370/254 |
| 2014/0149794 | A1 | 5/2014 | Shetty et al. |
| 2014/0244809 | A1* | 8/2014 | Kang .................... H04L 67/565 709/220 |
| 2015/0229590 | A1 | 8/2015 | Li et al. |
| 2017/0201416 | A1 | 7/2017 | McMullen |
| 2018/0322118 | A1* | 11/2018 | Hu ...................... H04L 41/0895 |
| 2019/0166108 | A1 | 5/2019 | Larson et al. |
| 2020/0036589 | A1* | 1/2020 | A ........................ H04L 41/0813 |
| 2020/0403863 | A1* | 12/2020 | A ........................ H04L 41/0813 |

FOREIGN PATENT DOCUMENTS

| | | |
|---|---|---|
| CN | 103235793 A | 8/2013 |
| CN | 103353867 A | 10/2013 |
| CN | 107710196 A | 2/2018 |
| CN | 107786446 A | 3/2018 |
| CN | 110119292 A | 8/2019 |
| CN | 110413588 A | 11/2019 |
| EP | 3392784 A1 | 10/2018 |
| WO | 2015084144 A1 | 6/2015 |
| WO | 2019228622 A1 | 12/2019 |

OTHER PUBLICATIONS

Bjorklund, M., "YANG—A Data Modeling Language for the Network Configuration Protocol (NETCONF)," Internet Engineering Task Force (IETF), Request for Comments: 6020, Category: Standards Track, ISSN: 2070-1721, Oct. 2010, 173 pages.

Bjorklund, M., "The YANG 1.1 Data Modeling Language," Internet Engineering Task Force (IETF), Request for Comments: 7950, Category: Standards Track, ISSN: 2070-1721, Aug. 2016, 217 pages.

Enns. R. et al, "Network Configuration Protocol (NETCONF)," Internet Engineering Task Force (IETF), Request for Comments: 6241, Obsoletes: 4741, Category: Standards Track, ISSN: 2070-1721, Jun. 2011, 113 pages.

Zheng, H. et al., "A Yang Data Model for Transport Network Client Signals draft-ietf-ccamp-client-signal-yang-00," CCAMP Working Group, Internet-Draft, Intended Status: Standards Track, Expires: Nov. 28, 2019, Huawei Technologies, May 27, 2019, 50 pages.

* cited by examiner

METHOD, APPARATUS, AND SYSTEM FOR SENDING CONTROL REQUEST BASED ON KEY VALUE CONFIGURATION

CROSS-REFERENCE TO RELATED APPLICATIONS

This application is a continuation of International Application No. PCT/CN2020/127353, filed on Nov. 7, 2020, which claims priority to Chinese Patent Application No. 202010101978.2, filed on Feb. 19, 2020. The disclosures of the aforementioned applications are hereby incorporated by reference in their entireties.

TECHNICAL FIELD

The present invention relates to the field of communication technologies, and in particular, to a method, an apparatus, and a system for sending a control request based on a key value configuration.

BACKGROUND

Currently, network operators need to construct and operate multi-layer multi-domain networks. The multi-layer multi-domain networks include a technology layer, a management layer, and a vendor layer. Implementation of inter-domain interoperability is a persistent problem for the network operators. Effective planning is required for cross-domain connections of growing new services. In addition, new interfaces need to be manually added for devices from different vendors, and manual operations are needed to implement joint management and control across IP and optical layers.

Abstraction and control of traffic engineered networks (ACTN) is dedicated to providing virtual network architectures and solutions thereof, especially in terms of meeting requirements of software defined networking (SDN). ACTN creates a virtual network environment by building an infrastructure for virtual network operations, allowing the network operators to see a plurality of management layers, a plurality of vendors, and abstract multi-layer networks, and operate, control, and manage these multi-layer networks as a single virtual network.

FIG. 1 is a diagram of an existing ACTN network architecture. As shown in FIG. 1, an ACTN network is divided into four layers from top to bottom: a multi-domain service controller (MDSC), a physical network controller (PNC), a customer network controller (CNC), and a physical network. The physical network is divided into different domains based on different PNCs to which network devices belong. Each domain is controlled by a specific PNC. The MDSC controls all PNCs, to indirectly grasp a running status of the entire network and perform control operations. The CNC is a controller directly oriented to a customer. All operations performed by the CNC on the network are performed by using the MDSC.

YANG (Yet Another Next Generation) is a standard data modeling language determined by the Internet Engineering Task Force (IETF). YANG is used to define data sent according to a network management protocol. A data model of YANG is referred to as a YANG data model or a YANG model. The YANG model may be used to model configuration data and status data of network elements.

When the YANG model is applied in the existing ACTN network architecture, because service identifiers in a network management system and the MDSC are not unified, the PNC usually needs to have two sets of interfaces to interconnect with the MDSC and the network management system separately, and further needs to convert the identifiers. Therefore, great complexity is introduced. In addition, when the multi-domain service controller cannot allocate a unique identifier, the PNC usually allocates a unique identifier to identify a service after receiving a service request. This method does not comply with the standard protocol, and cross-vendor interworking cannot be implemented by using a proprietary protocol. Therefore, when a subnet of a vendor exists in the existing network, unique identifiers cannot be allocated in a unified manner, and management problems are caused.

SUMMARY

To resolve a problem that great complexity is introduced because service identifiers in a network management system and a control system are not unified and a physical network controller needs to have two sets of interfaces and needs to convert the identifiers, embodiments of the present invention provide a method, an apparatus, and a system for sending a control request based on a key value configuration, thereby achieving compatibility with different key values in an existing data model, unifying data structures used by different systems, reducing complexity of processing, and implementing key value allocation in a unified manner while improving a client-side key value allocation mechanism. The technical solutions are as follows.

According to a first aspect, an embodiment of the present invention provides a method for sending a control request based on a key value configuration. The method includes the following steps, including a client controller generates a control request, where the control request includes a plurality of configuration parameters, the plurality of configuration parameters include a flexible key value, a control object name, and a universally unique identifier (UUID), the flexible key value is used to identify a requested control object, and the flexible key value is determined by using the control object name or the UUID. The client controller sends the control request to a server controller, where the control request is used to indicate the server controller to configure the control object.

According to a second aspect, an embodiment of the present invention provides a method for receiving a control request based on a key value configuration. The method includes the following steps, including a server controller receives a control request sent by a client controller, where the control request includes a plurality of configuration parameters, the plurality of configuration parameters include a flexible key value, a control object name, and a universally unique identifier (UUID), the flexible key value is used to identify a requested control object, and the flexible key value is determined by using the control object name or the UUID. The server controller configures the control object based on the flexible key value.

According to a third aspect, an embodiment of the present invention provides an apparatus for sending a control request based on a key value configuration. The apparatus is applied to a client controller, the client controller is connected to a server controller, and the apparatus includes a construction unit, configured to generate a control request, where the control request includes a flexible key value, a control object name, and a universally unique identifier (UUID), the flexible key value is used to identify a requested control object, and the key value is determined by using the control object name or the UUID, and a sending unit, configured to send the control request to the server controller.

According to a fourth aspect, an embodiment of the present invention provides an apparatus for receiving a control request based on a key value configuration. The apparatus is applied to a server controller, the server controller is connected to a client controller, and the apparatus includes a receiving unit, configured to receive a control request sent by the client controller, where the control request includes a plurality of configuration parameters, the plurality of configuration parameters include a flexible key value, a control object name, and a universally unique identifier (UUID), the flexible key value is used to identify a requested control object, and the flexible key value is determined by using the control object name or the UUID, a parsing unit, configured to parse the control request, and a configuration unit, configured to configure the control object based on the plurality of configuration parameters obtained through parsing.

According to a fifth aspect, an embodiment of the present invention provides a computer-readable storage medium. The computer-readable storage medium stores a computer program, and the computer program is used to implement the method according to any one of the possible designs of the first and second aspects.

According to a sixth aspect, an embodiment of the present invention provides a computer program product including instructions. When the computer program product is run on a computer, the computer is enabled to perform the method according to any one of the possible designs of the first and second aspects.

According to a seventh aspect, an embodiment of the present invention provides a system for transceiving a control request based on a key value configuration. The system includes a client controller and a server controller, and the client controller is connected to the server controller, the client controller includes the apparatus according to any one of the third aspect and the possible designs of the third aspect, and the server controller includes the apparatus according to any one of the fourth aspect and the possible designs of the fourth aspect.

DETAILED DESCRIPTION OF ILLUSTRATIVE EMBODIMENTS

Figure 1:
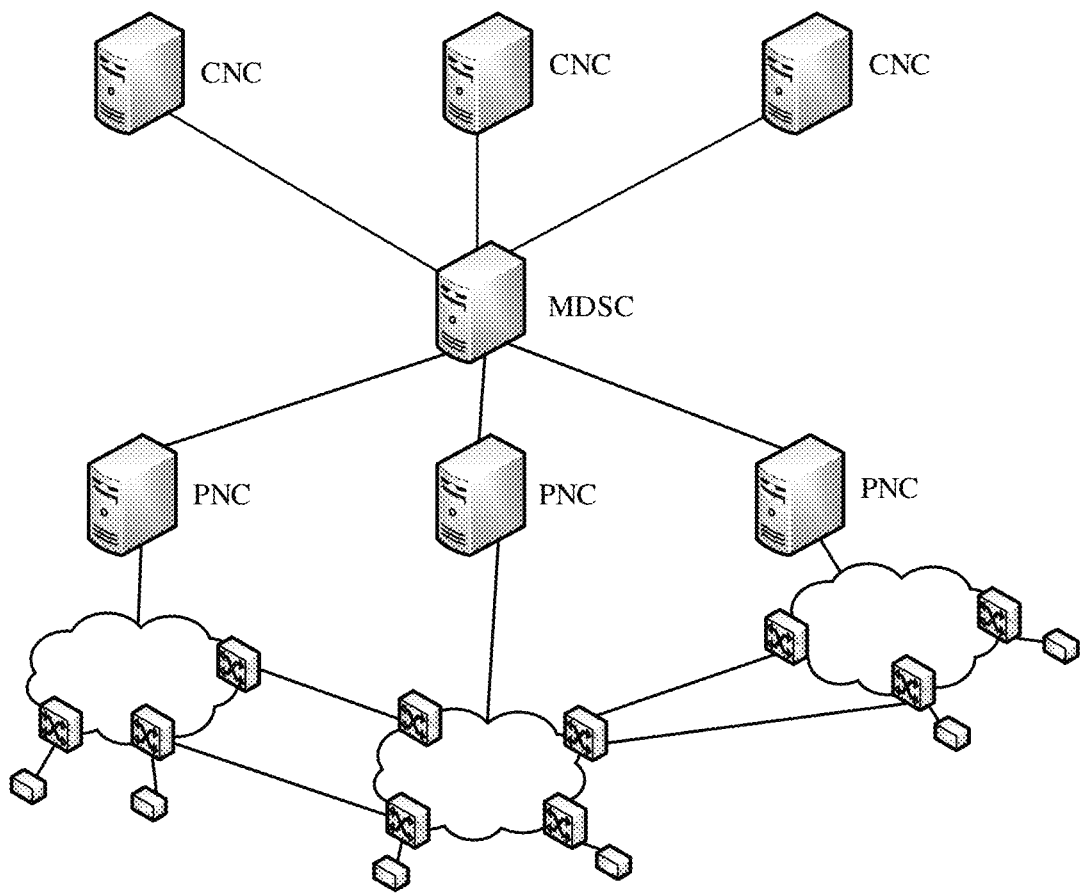
FIG. 1 is a diagram of an existing ACTN network architecture.

The following clearly describes the technical solutions in embodiments of the present invention with reference to the accompanying drawings in embodiments of the present invention. It is clear that the described embodiments are merely some rather than all of embodiments of the present invention. All other embodiments obtained by a person skilled in the art based on embodiments of the present invention shall fall within the protection scope of the present invention.

In the present invention, a YANG model is used to define data sent according to a network management protocol. The network management protocol may be the network configuration protocol (NETCONF), or may be another protocol. The present invention is described by using an example in which the YANG model is used as a modeling framework of the NETCONF protocol.

NETCONF is a network management protocol based on an extensible markup language (XML). The NETCONF protocol uses a four-layer architecture, including an application protocol layer, a remote procedure call (RPC) layer, an operation layer, and a content layer. The YANG model is used to perform data modeling on the content layer, operation layer, and RPC layer of the NETCONF protocol.

Specifically, the NETCONF protocol uses a client/server (C/S) architecture. A NETCONF client configures a NETCONF server by using the NETCONF protocol. The NETCONF client uses the YANG model to model configuration data, and then uses the XML to encode the modeled configuration data to obtain an XML file. A NETCONF message delivered by the NETCONF client to the NETCONF server carries the XML file. Correspondingly, after receiving the NETCONF message from the NETCONF client, the NETCONF server parses content of the message to obtain the configuration data. Specifically, in the present invention, a multi-domain service controller MDSC and a network management device, as client controllers, model service configuration data by using the YANG model, and then deliver the modeled configuration data in an XML file format to a server PNC, and the server PNC obtains the configuration data by parsing the modeled configuration data, and configures a service based on a requirement.

It should be noted that, in an existing ACTN network architecture, a CNC may also interact with the MDSC by using the NETCONF protocol. Specifically, the CNC, as a client, sends a service configuration request, and the MDSC, as a server, responds to the request. It should be understood that the technical solution of the present invention is based on a "client-server" interaction relationship. Therefore, there is a basis for applying the technical solution of the present invention between all devices that meet the interaction relationship in a network. This is not limited in the present invention. The present invention is described only by using an example in which the PNC is a server, and the MDSC and the network management device are clients. In the present invention, the PNC is also referred to as a server controller, and the MDSC and the network management device are collectively referred to as client controllers.

Control requests in embodiments of the present invention include a service request, a tunnel request, a topology information obtaining request, and the like. One or more of the requests may be implemented by a network configured by a physical network controller. The service request is merely used as an example for description in embodiments of the present invention.

Figure 2:
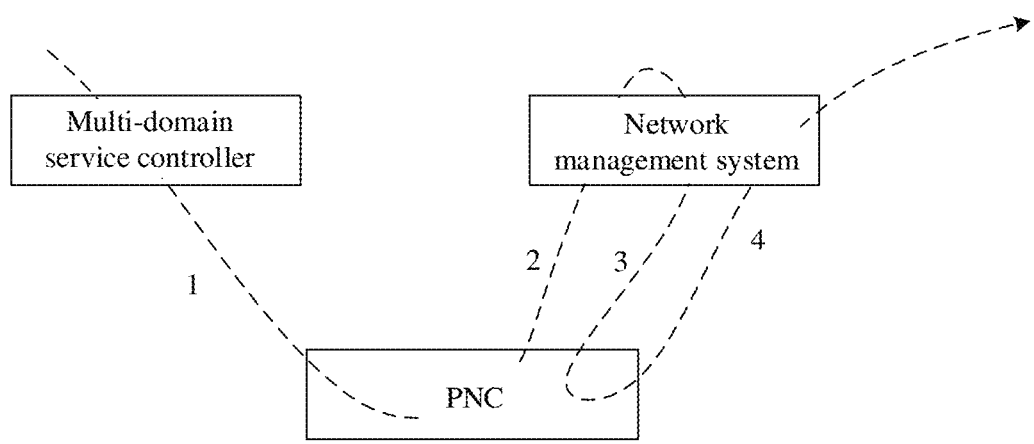
FIG. 2 is a schematic diagram of a lifecycle of service provisioning and management.

FIG. 2 is a schematic diagram of a lifecycle of service provisioning and management. In a current network, a controller and a network management system have clear division of labor. The controller is responsible for service planning, path computation, and service provisioning. After a service is provisioned, the network management system monitors performance of the service, and is responsible for adjusting and maintaining the service. As shown in FIG. 2, an entire lifecycle of the service includes four phases: 1. service provisioning, 2. service registration, 3. service adjustment, and 4. adjustment completion. A service provisioning process relates to interaction between a PNC and a multi-domain service controller. A process after service registration, service adjustment, and adjustment completion relates to interaction between the PNC and the network management system. In addition, the lifecycle of the service is temporally successive. Using a specific service as an example, the multi-domain service controller delivers a first service request (for example, a service provisioning request) to the PNC by using the YANG model, and the PNC responds after parsing configuration data. After the service provisioning is completed, monitoring and management and maintenance of the service are completely handed over to the network management system. When the network management system detects that the service is abnormal, the network management system delivers a second service request (such as modification or shutdown) to the PNC by using the YANG model. After parsing the configuration data, the PNC adjusts the service based on a requirement, and then sends a response to the network management system.

When a client controller models a service request by using the YANG model, because the multi-domain service controller and the network management system respectively use different service identifiers as key values, and only one data type is defined for a key value field in a syntax structure of the existing YANG model, the PNC requires two sets of interfaces to match data formats of the multi-domain service controller and the network management system respectively. In a data model, a key value is a mandatory field used to identify a service, and may be specifically a service name or a universally unique identifier (UUID), or may be in another format, such as a media access control (MAC) address. Generally, different client controllers can use only a data type in a fixed format as a key value. For example, the multi-domain service controller MDSC uses the service name as a key value, and the network management system uses the UUID as a key value. For example, the service name is like a name of a person, and the UUID is like an identity number of a person. Both the service name and the UUID may be used to identify a specific person. However, usually, only one of the service name and the UUID can be used as an identifier in a specific system or scenario.

For example, the multi-domain service controller constructs a service request by using the existing YANG model.

+--rw client-svc-instances* [client-svc-name]
+--rw client-svc-name string
+--rw client-svc-uuid? yang:uuid
+--rw client-svc-descr? String The foregoing model shows a service identifier part of the service request. The service identifier is an identification field for distinguishing a service from another service. In the embodiments of the present invention, a service name used as a key value, a UUID, a service description, and the like are included. A field rw before each line indicates that the parameter is readable and writable, "?" indicates that the parameter is optional, and "*" identifies a list structure, indicating that client-svc-instances may include one or more services. The service identifier part includes mandatory fields and optional fields. The service entity client-svc-instances, key value [client-svc-name], and service name client-svc-name are mandatory fields. The key value in the data model of the multi-domain service controller is consistent with a value of the service name, that is, the service name is used as the key value. The universally unique identifier client-svc-uuid and service description client-svc-descr are optional fields. In the data model of the multi-domain service controller, it is specified that only the service name can be used as the key value, and a data type of the key value is correspondingly a string, but other information (such as the MAC address) cannot be used as the key value. Although writing other information into the format of the service name can break this limitation, the multi-domain service controller cannot write the service name. Therefore, inconvenience is caused to subsequent service processing. Similarly, when the network management system constructs a service request by using the YANG model, in a controller solution that is effectively compatible with the network management system, the UUID is usually used to replace the original service name field client-svc-name, and the UUID is used as the key value of the data model. In this solution, the network management system still cannot write the service name. Therefore, on an actual user interface, the service does not have a specific service name. Instead, the service name is reflected by the UUID. Because a hexadecimal encoding format is not conducive to human understanding in human-machine interaction, usually matching can be performed only by using a search function. Therefore, the solution is not user-friendly.

The present invention provides a method for sending a service request based on a key value configuration. The method enables a PNC to interconnect with a multi-domain service controller and a network management system by using one set of interfaces, parse configuration data in a data model, and respond. Specifically, the method can be implemented by improving a syntax structure of a YANG model.

Figure 3:
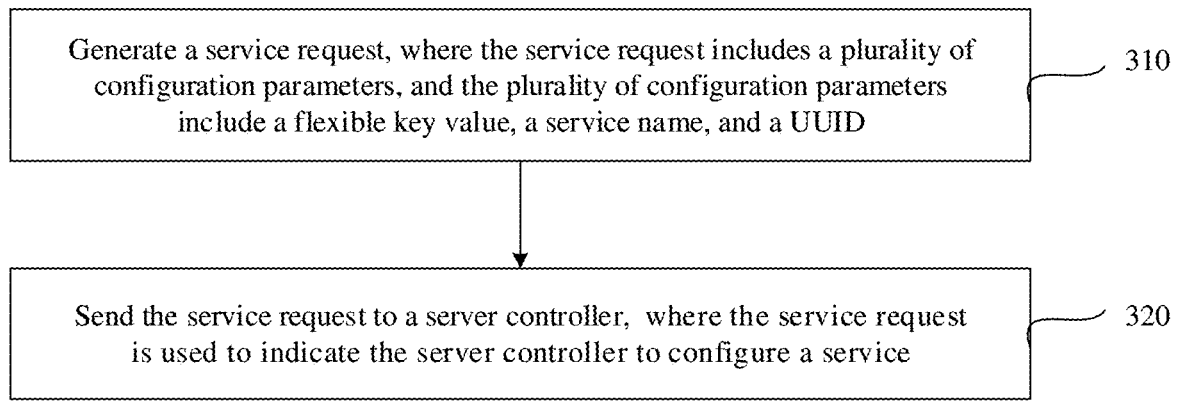
FIG. 3 is a flowchart of a method for sending a control request based on a key value configuration according to an embodiment of the present invention.

With reference to FIG. 3, the following describes a solution provided in embodiments of the present invention. FIG. 3 is a flowchart of a method for sending a service request based on a key value configuration according to an embodiment of the present invention. In the method, an execution body is a client controller, and specifically includes a first client controller and a second client controller. For example, the first client controller may be a multi-domain service controller MDSC (for example, an NCE-Super), and the second client controller may be a network management system. This embodiment is described by using an example in which the multi-domain service controller serves as the first client controller and the network management system serves as the second client controller. The method specifically includes the following steps.

Step 310: Generate a service request, where the service request includes a plurality of configuration parameters, and the plurality of configuration parameters include a flexible key value, a service name, and a UUID.

In this embodiment, the service request may be a service provisioning request or a service adjustment request. For example, the multi-domain service controller may generate a service provisioning request, and the network management system may generate a service adjustment request, where the service adjustment request includes a service modification request and a service shutdown request. The service request is constructed by using a predefined data model, for example, a YANG model. The predefined data model is a flexible data structure constructed by using a modeling mechanism of the existing YANG model. A new parameter client-svc-title is predefined in the data model as the flexible key value. The flexible key value means that the field may be written with different data types as unique key values based on different execution bodies. For example, the predefined data model may be represented by using the following data structure:

```
+--rw client-svc-instances* [client-svc-title]
+--rw client-svc-id union (uint16, uuid, string)
+--rw client-svc-name? string
+--rw client-svc-uuid? yang:uuid
+--rw client-svc-descr? string
```

It should be noted that the foregoing data structure shows only a service identifier part of the predefined data model. Actually, the model further includes other configuration data, such as a service source node, a service sink node, a service signal type, customer information, and a bandwidth. Details are not described in this embodiment. In this embodiment, client-svc-title indicates a flexible key value field, and "client-svc-id union (uint16, uuid, string)" indicates that a type of the flexible key value field may be uint16, uuid, or string, where a data type of the service name is generally string. In addition, a conventional Simple Network Management Protocol/management information base (SNMP/MIB) controller uses a field of the uint16 type as the service name. A data type of the UUID is uuid. It should be understood that the data type of the flexible key value in this solution is not limited to the foregoing three types. The predefined parameter also reserves expansion space for future possible key value types. In the predefined data model provided in this embodiment of the present invention, the service name or the UUID is selected as the key value based on the flexible key value parameter. When the service name is used as the key value, the flexible key value field [client-svc-title] and the service name field client-svc-name need to be written, and their values are consistent, so that a server controller determines that the actual key value is the service name. The UUID field client-svc-uuid is optional, and whether to configure the field may be chosen. If the field is configured, the data type of the field should be uuid. When the UUID is used as the key value, the flexible key value field [client-svc-title] and the UUID field client-svc-uuid need to be written, and their values are consistent, so that the server controller determines that the actual key value is the UUID. The service name field client-svc-name is optional, and whether to configure the field may be chosen. If the field is configured, the data type of the field should be string. In this way, a plurality of service identifiers can be configured for each service request. For example, the network management system may configure the service name when configuring the UUID, to facilitate human-machine interaction.

In this embodiment, the client controller may construct the service request by using the predefined data model. For example, the multi-domain service controller writes the flexible key value field and the service name field with a service name "1GEth-userA-number1" as the key value of the predefined data model, where "1GEth-userA-number1" indicates a first 1GE service of a user A, and the multi-domain service controller may choose whether to configure the UUID in the model. The network management system uses the UUID as the key value of the predefined data model, and the UUID may be a hexadecimal string including a hyphen, for example, 0eec43fd-d3ae-4acc-a28b-0bca733c70b8. The network management system writes the flexible key value field and the UUID field with the string, and can choose whether to configure the service name. Therefore, the server controller may determine a value of the actual key value by querying the three configuration parameters of the flexible key value, the service name, and the UUID in the predefined data model.

In an example, the client controller may determine the type of the flexible key value through negotiation with the server controller. For example, the multi-domain service controller determines, through negotiation with the server controller, to use the service name as the flexible key value, and the network management system determines, through negotiation with the server controller, to use the UUID as the flexible key value. In this way, after determining the actual key value, the server controller can determine a source of the service request and a configuration rule of the service.

In an example, the client controller receives a response message sent by the server controller, and stores the response message in a same service request database, for a subsequent service status query. The response message is used to indicate a configuration status of the service, for example, may be a reply message in an hypertext transport protocol (HTTP) format, and includes three parts: a status line, a packet, and a response body. The status line may include content such as version information, a status code, and a code translation. Specifically, the configuration status includes but is not limited to service request configuration success, service request configuration failure, a service request error, or the like.

In an example, when the client controller cannot allocate a unique key value, the client controller may send a key value request message to the server controller to request a key value. For example, the key value request message includes a parameter "next-available-client-svc-title", indicating a next available value that meets a key value requirement. In addition, the message may further include an expected key value type, for example, one of uint16, uuid, and string. After receiving the key value that meets the requirement and that is sent by the server controller, the client controller confirms the type and the specific value of the key value, and constructs a service request based on the key value.

Step 320: Send the service request to the server controller, where the service request is used to indicate the server controller to configure the service.

In this embodiment, the server controller may be a PNC or another similar equivalent controller. The service request is configuration data constructed by using the predefined data model, and may be specifically a service provisioning request or a service adjustment request. For example, the multi-domain service controller generates a service provisioning request, and the network management system generates a service adjustment request, including a service modification request and a service shutdown request.

In an example, the service request is sent to the server controller based on the NETCONF protocol.

In summary, according to the technical solution in this embodiment, different client controllers can separately choose to configure key values of different data types in one set of data models, and can simultaneously configure a plurality of service identifiers, thereby resolving a problem that only one of a service name and a UUID can be configured and that a server controller requires two sets of interfaces separately for interconnection in the prior art.

Figure 4:
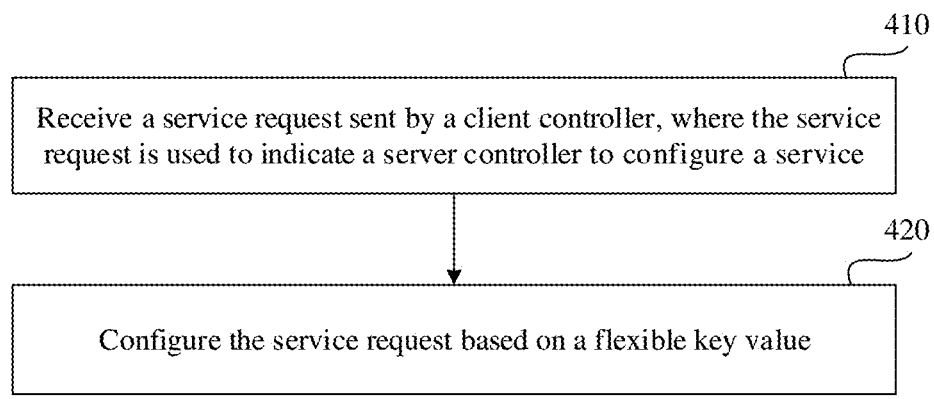
FIG. 4 is a flowchart of a method for receiving a control request based on a key value configuration according to an embodiment of the present invention.

FIG. 4 is a flowchart of another method for receiving a service request based on a key value configuration according to an embodiment of the present invention. In the method, an execution body is a server controller, and may be specifically a PNC or another similar equivalent controller. The method specifically includes the following steps.

Step 410: Receive a service request sent by a client controller, where the service request is used to indicate the server controller to configure a service.

In this embodiment, the service request is constructed by using a predefined data model. The predefined data model includes a plurality of configuration parameters. The plurality of configuration parameters include a flexible key value, a service name, and a UUID, and may further include a service source node, a service sink node, a service signal type, customer information, a bandwidth, and the like. The flexible key value is used to identify the service request. The service name and the UUID are used to determine the flexible key value. The service source node, service sink node, service signal type, customer information, bandwidth, and the like are used for a specific service configuration.

For example, a field type of the flexible key value includes at least a part of field types of the service name and the UUID.

Step 420: Configure the service based on the flexible key value.

The server controller parses configuration data in the service request, queries the three fields: flexible key value, service name, and UUID based on the configuration data obtained through parsing, and determines the key value.

In an example, if the flexible key value is consistent with a value of the service name, it is determined that the flexible key value is the service name, and the service is configured according to a multi-domain service controller rule, or if the flexible key value is consistent with a value of the UUID, it is determined that the flexible key value is the UUID, and the service is configured according to a network management system rule.

In an example, the server controller may determine, through negotiation with a multi-domain service controller, to use the service name as the flexible key value, and/or the server controller determines, through negotiation with a network management system, to use the UUID as the flexible key value.

In some cases, if the multi-domain service controller chooses to configure the UUID while using the service name as the key value, after completing the service configuration based on a query result according to the multi-domain service controller rule, the server controller (such as a PNC) may forward the UUID to the network management system, for subsequent service maintenance.

In other cases, if the multi-domain service controller chooses not to configure the UUID while using the service name as the key value, after completing the service configuration based on a query result according to the multi-domain service controller rule, the server controller (such as a PNC) may generate a corresponding UUID value based on the service name, and send the UUID value to the network management system. The UUID value is then used as a key value in a data model constructed by the network management system, and is used to identify the service. For example, the server controller generates a corresponding UUID 0eec43fd-d3ae-4acc-a28b-0bca733c70b8 based on a service name "1GEth-userA-number1", and then the network management system sends a service modification request message "adjust a bandwidth to 10 Gbps for the 0eec43fd-d3ae-4acc-a28b-0bca733c70b8 service, and adjust a route to A-X-Z" to the server controller. In the constructed predefined data model, 0eec43fd-d3ae-4acc-a28b-0bca733c70b8 used as a key value is mandatory, and other fields (such as the service name) may be optional.

In an example, after configuring, based on the configuration data obtained through parsing, the service request sent by the client controller, the server controller sends a response message to the client controller, and stores the configuration data in a same configuration database to facilitate a service query and maintenance. The response message may be sent by using an existing mechanism specified in the NETCONF protocol or the Representational State Transfer Configuration (RESTCONF) protocol.

In an example, when the client controller cannot allocate a unique key value, the server controller receives a key value request message sent by the client controller, and sends, to the client controller, a key value that meets a requirement. For example, the server controller receives a key value request message sent by the client controller, where the key value request message includes a parameter "next-available-client-svc-title", indicating a next available value that meets the key value requirement, and the message may further include an expected key value type, for example, one of uint16, uuid, and string. After receiving the message, the server controller feeds back a service identifier that meets the key value type requirement of the client controller to the client controller. Then the client controller may confirm the type and the specific value of the key value, and construct a service request based on the key value.

Figure 5:
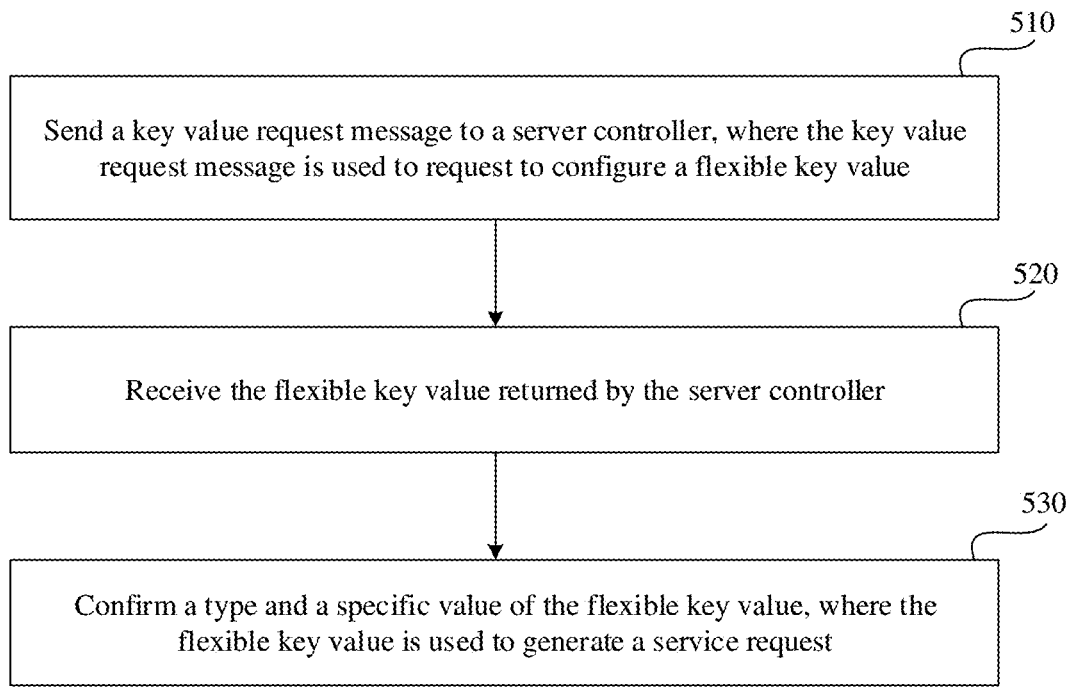
FIG. 5 is a flowchart of another method for sending a control request based on a key value configuration according to an embodiment of the present invention.

With reference to FIG. 5, the following describes another solution provided in embodiments of the present invention. FIG. 5 is a flowchart of another method for sending a service request based on a key value configuration according to an embodiment of the present invention. In the method, an execution body is a client controller, including an MDSC or another equivalent controller, and may be specifically a multi-domain service controller (such as an NCE-Super) or a network management system. The method specifically includes the following steps.

Step 510: Send a key value request message to a server controller, where the key value request message is used to request to configure a flexible key value.

An application scenario of this embodiment is that if the client controller cannot allocate a unique key value, the client controller sends the key value request message to the server controller to request at least one flexible key value that meets a requirement. The key value request message is constructed by using a predefined data model. The key value request message includes at least a configuration parameter "next-available-client-svc-title", indicating a next available value that meets the key value requirement. In addition, the key value request message may further include an expected key value type, for example, one of uint16, uuid, and string.

In an example, an implementation of this embodiment is to add an optional field next-available-client-svc-title to the predefined data model. The following is a YANG data model applicable to this embodiment.

+--ro next-available-client-svc-title? uint16
    +--rw client-svc-instances* [client-svc-title]
    +--rw client-svc-id union (uint16, uuid, string)
    +--rw client-svc-name? string
    +--rw client-svc-uuid? yang:uuid
    +--rw client-svc-descr? string A first line is the optional field added to the predefined model. A data type of the field is uint16, and the field is used as a read-only parameter for performing retrieval by the server controller. When the server controller finds this field, the server controller returns, to the client controller, a key value that meets the requirement.

For example, when the network management system does not have a capability of generating a unique key value, the network management system requests, from the server controller by writing a ro field "next-available-client-svc-id" in the predefined data model, a key value whose data type is uuid, and sends a key value request message including the ro field to the server controller.

For example, the next-available-client-svc-title parameter may be further obtained by using a remote procedure call (RPC) mechanism in the RESTCONF protocol or an action. A method for obtaining the next-available-client-svc-title field is not limited in this embodiment of this application.

Step 520: Receive the flexible key value returned by the server controller.

For example, after receiving the foregoing request message, the server controller feeds back, to the network management system, at least one flexible key value that meets the type requirement of the network management system, for example, 0eec43fd-d3ae-4acc-a28b-0bca733c70b8, and the network management system receives the flexible key value.

Step 530: Confirm the type and specific value of the flexible key value, where the flexible key value is used to generate a service request.

For example, the network management system confirms that the data type of the received key value is uuid, and the specific value is 0eec43fd-d3ae-4acc-a28b-0bca733c70b8, and the network management system writes a key value field and a UUID field in the predefined data model with the flexible key value. For example, the network management system may further customize a service name based on the flexible key value, and write the predefined data model with the service name.

Figure 6:
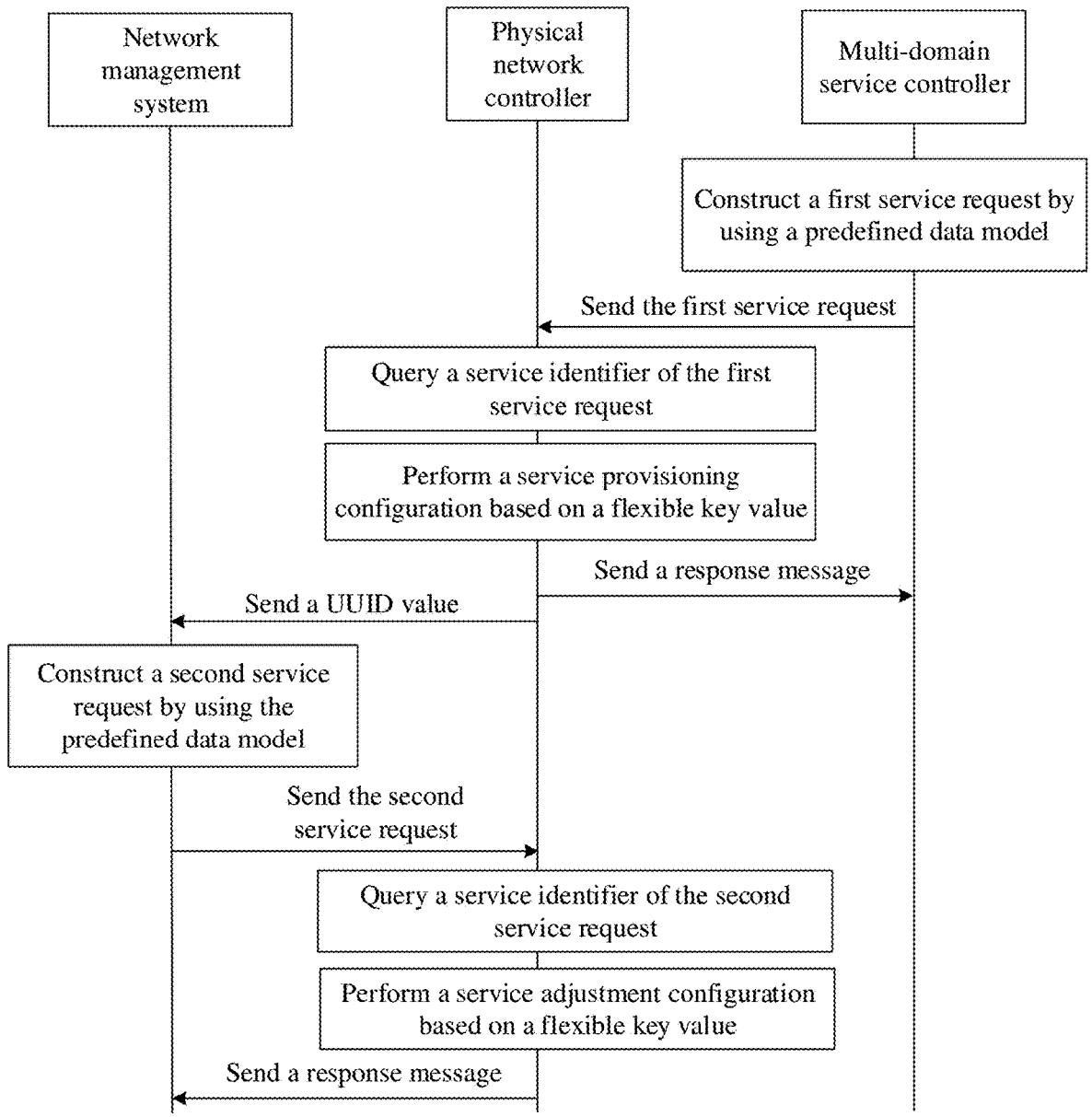
FIG. 6 is a time sequence diagram for sending a control request based on a key value configuration according to an embodiment of the present invention.

FIG. 6 is a time sequence diagram of a method for sending a service request based on a key value configuration according to an embodiment of the present invention. It should be noted that, in this embodiment, a complete lifecycle of a specific service is used as an example to describe the technical solution. It should be understood that, in a communication network, each specific service has a complete lifecycle in temporal succession. However, at a specific moment, a service request received by a server controller may be a provisioning request from a multi-domain service controller for a service 1, or may be an adjustment request from a network management system for a service 2. Therefore, the server controller requires a technical solution for determining a source of the service request and a specific configuration rule applicable to the service request.

This embodiment is described still by using an example in which the multi-domain service controller serves as a first client controller, the network management system serves as a second client controller, and a PNC serves as the server controller. The method specifically includes the following steps.

Step 600: The multi-domain service controller constructs a first service request by using a predefined data model.

The first service request is used to request the server controller to perform a specific service provisioning configuration, and is constructed by using a predefined YANG model. The predefined YANG model includes a plurality of pieces of configuration data, where the plurality of pieces of configuration data include a flexible key value, a service name, and a UUID, and may further include fields such as a service source node, a service sink node, a service signal type, and a bandwidth. The three fields of the flexible key value, the service name, and the UUID form a service identifier field, and the service name and the UUID are used to determine a flexible key value of the first service request.

Specifically, the multi-domain service controller writes the flexible key value field and the service name field, and values of the flexible key value field and the service name field are the same. In addition, it is also necessary to write configuration parameters such as the service source node, the service sink node, the service signal type, and the bandwidth in the YANG model.

Step 601: The multi-domain service controller sends the first service request to the PNC.

Step 602: The PNC receives the first service request, and queries a service identifier of the first service request.

The PNC parses the first service request based on the predefined data model to obtain configuration data of the first service request, and queries the service identifier field in the configuration data, that is, the flexible key value, the service name, and the UUID, and determines the flexible key value of the first service request by using the service name or the UUID.

Step 603: The PNC configures the first service request based on the flexible key value.

The PNC learns, by performing a query, that a value of the flexible key value field is the same as a value of the service name field, and determines that the flexible key value of the first service request is actually the service name, where the request comes from the multi-domain service controller, and then the PNC performs a service provisioning configuration based on the configuration data obtained through parsing and according to a multi-domain service controller rule.

Step 604: The PNC sends a response message to the multi-domain service controller.

For example, the multi-domain service controller stores the response message in a corresponding service request database to facilitate a service status query, and the PNC stores the configuration data of the first service request in a same configuration database to facilitate a service query and maintenance.

Step 605: The PNC sends a UUID to the network management system.

In this embodiment, the UUID may be the UUID field originally configured in the first service request, and is referred to as an original value, or may be a UUID value regenerated by the PNC based on the service name, and is referred to as a generated value. Specifically, if the multi-domain service controller configures the UUID field (original value) in the first service request, the multi-domain service controller confirms a data type and a specific value of the UUID field, and forwards the data type and the specific value of the UUID field to the network management system for subsequent service maintenance and management. If the multi-domain service controller does not configure the UUID field in the first service request, the PNC generates a corresponding UUID value (generated value) based on the service name field in the first service request, and sends the generated value to the network management system for subsequent service maintenance and management.

Step 606: The network management system constructs a second service request by using the predefined data model.

The foregoing steps 600 to 605 are a service provisioning process. After service provisioning is completed, service monitoring, management, and maintenance are handed over to the network management system. When detecting that the service is abnormal, if the network management system needs to perform a service adjustment, including modification or shutdown, the network management system generates the second service request by using the predefined data model.

The second service request is used to request the PNC to adjust the service, for example, request to adjust a service bandwidth to 10 Gbps, and adjust a route to A-X-Z. The predefined YANG model includes a plurality of pieces of configuration data, where the plurality of pieces of configuration data include a flexible key value, a service name, and a UUID, and may further include fields such as a service source node, a service sink node, a service signal type, a bandwidth, and a route. The three fields of the flexible key value, the service name, and the UUID, as a service identifier, are used by the server controller to determine an actual key value of the second service request. Specifically, the network management system writes the flexible key value field and the UUID field, and values of the two fields are the same, and the network management system chooses whether to write the service name field. In addition, it may also be necessary to write the fields such as the service source node, the service sink node, the service signal type, the bandwidth, and the route for the service adjustment.

Step 607: The network management system sends the second service request to the PNC.

Step 608: The PNC receives the second service request, and queries the service identifier of the second service request.

The PNC parses the second service request based on the predefined data model to obtain configuration data of the second service request, and queries the service identifier field in the configuration data, that is, the flexible key value, the service name, and the UUID, and determines the flexible key value by using the service name or the UUID.

Step 609: The PNC configures the second service request based on the flexible key value.

The PNC learns, by performing a query, that the value of the flexible key value field is the same as the value of the UUID field, and determines that the flexible key value of the second service request is actually the UUID, where the request comes from the network management system, and then the PNC performs a service adjustment configuration based on the configuration data obtained through parsing and according to a network management system rule.

Step 610: The PNC sends a response message to the network management system.

For example, the network management system stores the response message in a corresponding service request database to facilitate a service status query, and the PNC stores the configuration data of the second service request in the same configuration database to facilitate a service query and maintenance.

It should be noted that, before the first service request is sent, when the multi-domain service controller cannot generate a unique service name that meets a requirement as the flexible key value of the predefined data model, the multi-domain service controller may send a key value request message to the PNC to request to configure the flexible key value that meets the requirement. Generally, to ensure uniqueness of the identifier, the PNC feeds back one UUID to the multi-domain service controller. The multi-domain service controller writes the UUID field with the UUID, customizes one service name based on the UUID, and writes the flexible key value field and the service name field with the service name. Similarly, before sending the second service request, when the network management system cannot generate a unique UUID that meets a requirement as the flexible key value of the predefined model, the network management system may send a key value request message to the PNC to request to configure the flexible key value that meets the requirement. The PNC returns at least one UUID based on the requirement in the key value request message, and the network management system determines a specific value of the at least one UUID, and writes the flexible key value field and the UUID field with the specific value of the at least one UUID.

A method for sending a service request based on a key value configuration can be implemented according to content described in the foregoing embodiments. Correspondingly, an embodiment of the present invention further provides a client controller, configured to implement the method for sending a service request based on a key value configuration in the foregoing embodiment of the present invention. The client controller may be the multi-domain service controller in the embodiments of the present invention, or may be a network management system.

The client controller 700 includes a receiver 710, a processor 720, a transmitter 730, and a memory 740. The receiver 710, the processor 720, the transmitter 730, and the memory 740 are connected to each other by using a bus 750. The bus 750 may be a peripheral component interconnect standard (PCI) bus or an extended industry standard architecture (EISA) bus, or the like. The bus may be classified into an address bus, a data bus, a control bus, and the like. For ease of representation, only one thick line is used to represent the bus in FIG. 7, but this does not mean that there is only one bus or only one type of bus.

The receiver 710 and the transmitter 730 are communication interfaces for performing communication and interaction between the apparatus and another device. The communication interface may be a wired communication interface, a wireless communication interface, or a combination thereof. The wired communication interface may be, for example, an Ethernet interface. The Ethernet interface may be an optical interface, an electrical interface, or a combination thereof. The wireless communication interface may be a WLAN interface, a cellular network communication interface, a combination thereof, or the like.

The processor 720 may be a central processing unit (CPU), a network processor (NP), or a combination of a CPU and an NP.

The processor 720 may further include a hardware chip. The foregoing hardware chip may be an application-specific integrated circuit (ASIC), a programmable logic device (PLD), or a combination thereof. The foregoing PLD may be a complex programmable logic device (CPLD), a field-programmable gate array (FPGA), generic array logic (GAL), or any combination thereof.

The processor 720 is configured to construct a service request by using a predefined data model in any manner in the embodiments shown in FIG. 3 to FIG. 6, where the predefined data model includes a plurality of configuration parameters, the plurality of configuration parameters include a flexible key value, a service name, and a universally unique identifier (UUID), the flexible key value is used to identify a service, and the service name and the UUID are used to determine the flexible key value.

Further, when the client controller is implemented as a multi-domain service controller, the processor 720 is further configured to determine, through negotiation with a PNC, to use the service name as the flexible key value, or when the client controller is implemented as a network management system device, the processor 720 is further configured to determine, through negotiation with a PNC, to use the UUID as the flexible key value.

The memory 740 may include a volatile memory, for example, a random access memory (RAM). The memory may also include a non-volatile memory, for example, a flash memory, a hard disk drive (HDD), or a solid-state drive (SSD). The memory 740 may further include a combination of the foregoing types of memories. For example, the memory 740 may be further configured to store program instructions. When the processor 720 is a CPU, the processor 720 invokes the program instructions stored in the memory 740. When the processor 720 is hardware such as an FPGA or an ASIC, the processor 720 does not need to store program instructions in the memory 740, a person skilled in the art may directly write the program instructions into a hardware processor of the FPGA or the ASIC, and the FPGA or the ASIC may directly execute the program instructions.

The foregoing program instructions may implement one or more steps in the embodiments shown in FIG. 3 to FIG. 6, or in an optional implementation thereof, so that the MDSC implements a function of sending a service request based on a key value configuration in the foregoing method.

It should be noted that, in this embodiment of the present invention, different program instructions are stored in the memory 740, so that the client controller can implement different functions. For example, when the instructions stored in the memory are instructions that can be used to implement a cross-domain network controller (such as an NCE-Super), the client controller is the multi-domain service controller. When the instructions stored in the memory 740 are instructions that can be used to implement the network management system, the client controller is the network management system device.

In addition, the memory 740 may be further configured to store a response message sent by the PNC, where the response message is used to query a configuration status of the service.

In this embodiment of the present invention, the transmitter 730 is configured to send a service request to the physical network controller PNC. When the client controller is specifically implemented as the multi-domain service controller, the transmitter 730 is configured to send a first service request to the physical network controller, where the first service request is used for service provisioning. When the client controller 700 is specifically implemented as the network management system device, the transmitter 730 is configured to send a second service request to the physical network controller, where the second request is used for a service adjustment.

The receiver 710 is configured to receive a response message sent by the PNC, where the response message is used to indicate the configuration status of the service.

Further, the transmitter 730 is further configured to send a key value request message to the PNC, where the key value request message is used to request to configure a flexible key value that meets a requirement.

The receiver 710 is further configured to receive a key value sent by the PNC, where the key value is used to generate a service request.

When the client controller is implemented as the network management system device, the receiver 710 is further configured to receive an original value or a generated value of the UUID sent by the PNC.

Therefore, the client controller provided in this embodiment of the present invention can be applied to choose to configure different flexible key values in the predefined data model and generate different service requests, thereby achieving compatibility between different key values in an existing data model. Therefore, a same data structure can be used to interconnect with different systems for an entire service lifecycle, there is no need to perform identifier conversion or translation between different systems, and implementation complexity is greatly reduced.

Figure 8:
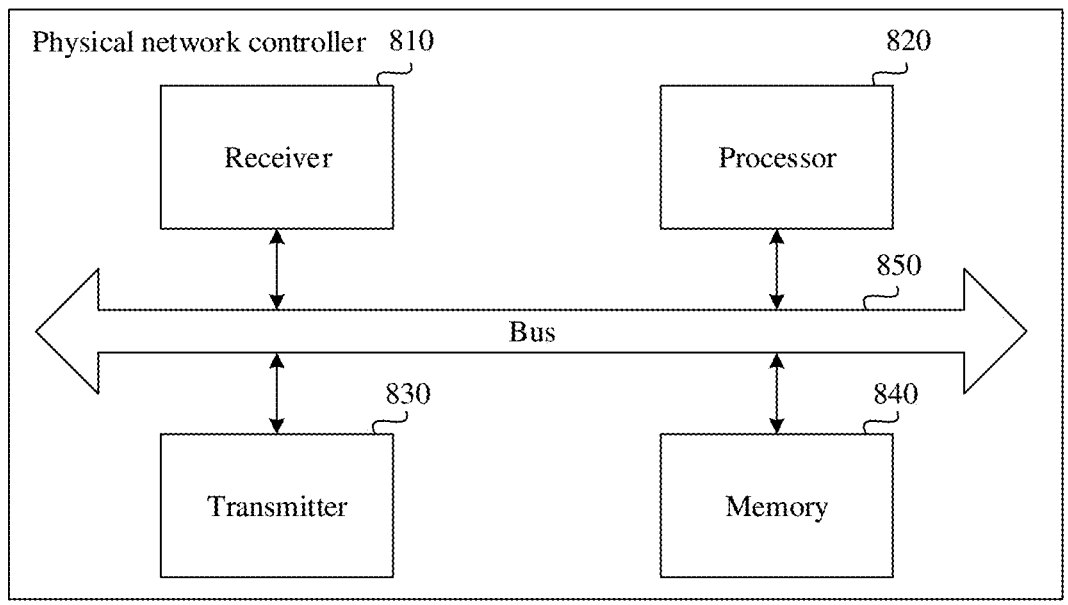
FIG. 8 is a schematic diagram of a hardware structure of another network device for sending a control request based on a key value configuration according to an embodiment of the present invention.

In addition, an embodiment of the present invention further provides a physical network controller, configured to implement the method for sending a service request based on key value configuration in the foregoing embodiment of the present invention. As shown in FIG. 8, the physical network controller includes a receiver 810, a processor 820, a transmitter 830, and a memory 840. The receiver 810, the processor 820, the transmitter 830, and the memory 840 are connected to each other by using a bus 850.

Figure 7:
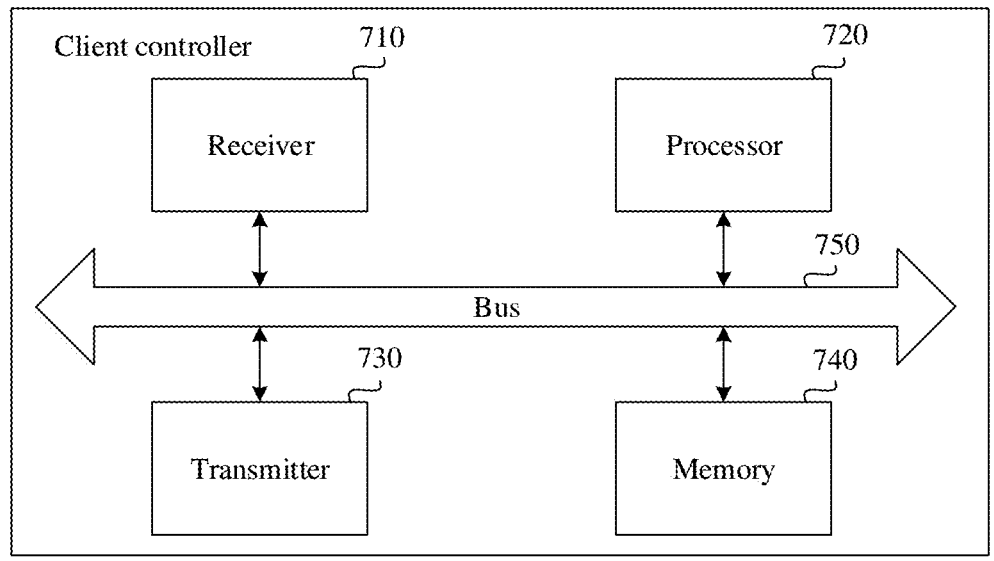
FIG. 7 is a schematic diagram of a hardware structure of a network device for sending a control request based on a key value configuration according to an embodiment of the present invention.

It may be understood that component types and structures of the receiver 810, the processor 820, the transmitter 830, the memory 840, and the bus 850 included in the foregoing physical network controller are the same as those of the components in the foregoing embodiment shown in FIG. 7. Details are not described herein again.

The receiver 810 is configured to receive a service request sent by a client controller, where the service request is constructed by using a predefined data model, the predefined data model includes a plurality of configuration parameters, the plurality of configuration parameters include a flexible key value, a service name, and a universally unique identifier (UUID), the flexible key value is used to identify a service, and the service name and the UUID are used to determine the flexible key value.

The transmitter 830 is configured to send a response message to the client controller, where the response message is used to indicate a configuration status of the service.

The receiver 810 is further configured to receive a key value request message.

The transmitter 830 is further configured to send, to the client controller, a key value that meets a requirement, where the key value is used to generate a service request.

Further, the transmitter 830 is further configured to send an original value or a generated value of the UUID to the client controller.

The processor 820 is configured to query the flexible key value, the service name, and the UUID field in the predefined data model, and configure the service request based on a query result.

Further, the processor 820 is specifically configured to if the flexible key value is consistent with a value of the service name, determine that the flexible key value is the service name, and configure the service according to a multi-domain service controller rule, or if the flexible key value is consistent with a value of the UUID, determine that the flexible key value is the UUID, and configure the service according to a network management system rule.

Further, the processor 820 is further configured to determine, through negotiation with a multi-domain service controller, to use the service name as the flexible key value, and/or determine, through negotiation with a network management device, to use the UUID as the flexible key value.

In addition, the processor 820 is further configured to generate a corresponding UUID value based on the service name.

The memory 840 is configured to store configuration data in a service configuration database.

Therefore, the physical network controller provided in this embodiment of the present invention is applied to receive different service requests constructed by the client controller by using the flexible key value, and parse and identify configuration data of the service requests in a unified manner, thereby achieving compatibility between different key values in an existing data model. Therefore, a same data structure can be used to interconnect with different systems for an entire service lifecycle, there is no need to perform identifier conversion or translation between different systems, and implementation complexity is greatly reduced.

In addition, an embodiment of the present invention further provides an apparatus for sending a service request based on a key value configuration. The apparatus may be configured to perform the method embodiment of the present invention. For details not disclosed in the apparatus embodiment of the present invention, refer to the method embodiment of the present invention.

Figure 9:
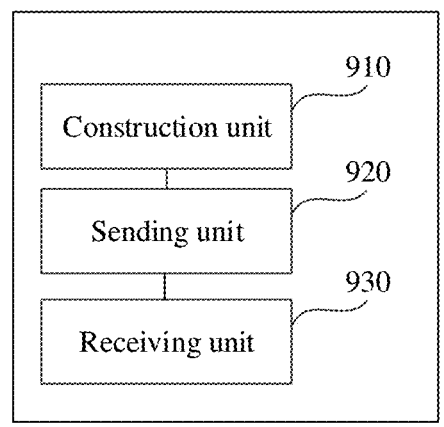
FIG. 9 is a schematic diagram of a structure of an apparatus for sending a control request based on a key value configuration according to an embodiment of the present invention.

FIG. 9 is a schematic diagram of a structure of an apparatus for sending a service request based on a key value configuration according to an embodiment of the present invention. The apparatus provided in this embodiment may be implemented as a part of a client controller or an entire client controller. Further, based on different functional instructions of internal units of the apparatus, the apparatus may be specifically implemented as a part of a network management system or a multi-domain service controller or an entire network management system or multi-domain service controller. The network management system or the multi-domain service controller is connected to a physical network controller. The physical network controller is connected to several lower-level devices. The network management system, the multi-domain service controller, and the physical network controller all support the NETCONF protocol. The apparatus may include a construction unit 910 and a sending unit 920.

The construction unit 910 is configured to construct a service request by using a predefined YANG data model.

The sending unit 920 is configured to send, to the physical network controller based on the network configuration protocol, the service request constructed by the construction unit 910.

For example, the apparatus may further include a storage unit. The storage unit is configured to store, in a database, a response message sent by the physical network controller, to facilitate a subsequent service query and maintenance or the like.

Further, the sending unit 920 is further configured to send a key value request message, where the key value request message is used to request to configure a flexible key value that meets a requirement.

The apparatus further includes a receiving unit 930, configured to receive a response message sent by the PNC, where the response message is used to indicate a configuration status of the service.

Further, the receiving unit 930 is further configured to receive the flexible key value sent by the PNC, where the flexible key value is used to construct the service request.

Figure 10A:
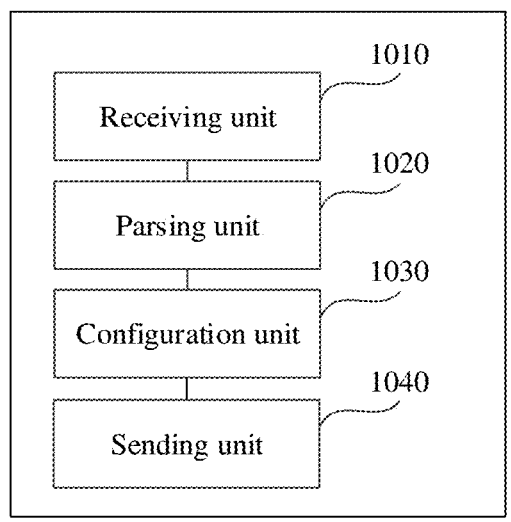
FIG. 10A is a schematic diagram of a structure of another apparatus for sending a control request based on a key value configuration according to an embodiment of the present invention.

FIG. 10A is a schematic diagram of a structure of an apparatus for sending a service request based on a key value configuration according to another embodiment of the present invention. The apparatus provided in this embodiment may be implemented as a part of a physical network controller or an entire physical network controller. The physical network controller is connected to a client controller (multi-domain service controller and/or network management device). The physical network controller is further connected to several lower-level devices. The lower-level devices are configured to configure a service. The client controller and the physical network controller support a unified network configuration protocol. The apparatus may include a receiving unit 1010, a parsing unit 1020, a configuration unit 1030, and a sending unit 1040.

The receiving unit 1010 is configured to receive a service request sent by the client controller based on the network configuration protocol. The service request is constructed by using a predefined data model, where the predefined data model includes a plurality of configuration parameters, the plurality of configuration parameters include a flexible key value, a service name, and a universally unique identifier (UUID), the flexible key value is used to identify the service, and the service name and the UUID are used to determine the flexible key value.

The parsing unit 1020 is configured to parse the service request based on a predefined YANG data model.

The configuration unit 1030 is configured to configure the service based on configuration data obtained through parsing.

The sending unit 1040 is configured to send a response message to the client controller after the configuration is completed.

Further, the receiving unit 1010 is further configured to receive a key value request message sent by the client controller, where the key value request message is used to request the physical network controller to configure a key value that meets a requirement.

Further, the parsing unit 1020 is further configured to parse the key value request message based on the predefined YANG model.

Further, the sending unit 1040 is further configured to send, to the client controller, the flexible key value that meets the requirement of the client controller.

Figure 10B:
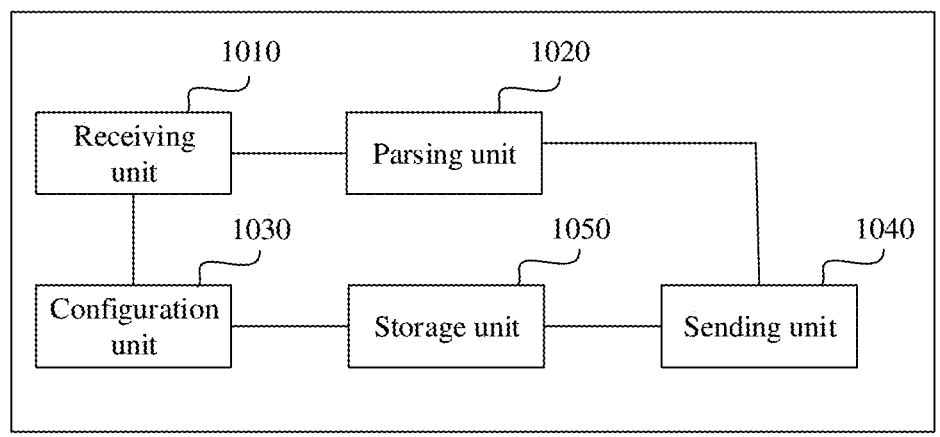
FIG. 10B is a schematic diagram of a structure of another apparatus for sending a control request based on a key value configuration according to an embodiment of the present invention.

In another optional embodiment provided based on the embodiment shown in FIG. 10A, as shown in FIG. 10B, the apparatus further includes a storage unit 1050.

The storage unit 1050 is configured to store the configuration data obtained through parsing in a same configuration database.

It should be noted that, when the apparatuses provided in the foregoing embodiments implement their functions, division of the foregoing functional units is merely used as an example for description. In an actual application, the foregoing functions may be allocated to different functional units for implementation as required. That is, an internal structure of the device is divided into different functional units to implement all or part of the functions described above. In addition, the apparatus in the foregoing embodiments and the method embodiments are based on a same concept. For a specific implementation process, refer to the method embodiments, and details are not described herein again.

The sequence numbers of the foregoing embodiments of the present invention are merely for illustrative purposes, and are not intended to indicate priorities of the embodiments.

A person of ordinary skill in the art may understand that all or some of the steps of the foregoing embodiments may be implemented by hardware or a program instructing related hardware. The program may be stored in a computer-readable storage medium. The storage medium may be a read-only memory, a magnetic disk, a compact disc, or the like.

The foregoing descriptions are merely example embodiments of the present invention, but are not intended to limit the present invention. Any modification, equivalent replacement, improvement, or the like made without departing from the spirit and principle of the present invention should fall within the protection scope of the present invention.

What is claimed is:

1. A method, comprising:
   generating, by a client controller, a control request, wherein the control request comprises a plurality of configuration parameters, wherein the plurality of configuration parameters comprise a flexible key value, a control object name, and a universally unique identifier (UUID), wherein the flexible key value identifies a requested control object, and wherein the flexible key value is determined, using at least one of the control object name or the UUID, according to a type of the client controller; and
   sending, by the client controller, the control request to a server controller, wherein the control request indicates to the server controller to configure the control object, and wherein the type of value of the flexible key value indicates, to the server controller, the type of client controller that is a source of the control object and further indicates a configuration rule for the control object.

2. The method according to claim 1, wherein a field type of the flexible key value comprises at least a part of field types of the control object name and the UUID.

3. The method according to claim 1, further comprising performing at least one of:
   configuring, by a multi-domain service controller, when the client controller is the multi- domain service controller, the flexible key value and the control object name in the control request, wherein the flexible key value is the same as a value of the control object name; or configuring, by a network management device, when the client controller is the network management device, the flexible key value and the UUID in the control request, wherein the flexible key value is the same as a value of the UUID.

4. The method according to claim 3, further comprising performing, before the sending the control request to the server controller, at least one of:
   determining, by the multi-domain service controller through negotiation with the server controller, to use the control object name as the flexible key value; or
   determining, by the network management device through negotiation with the server controller, to use the UUID as the flexible key value.

5. The method according to claim 1, further comprising performing, after the sending the control request to the server controller:
   receiving, by the client controller, a response message sent by the server controller, and storing the response message in a control request database, wherein the response message indicates a configuration status of the control object.

6. The method according to claim 1, further comprising performing, before the generating the control request:
   sending, by the client controller, a key value request message to the server controller, wherein the key value request message requests configuration of the flexible key value.

7. The method according to claim 1, further comprising performing, after the sending a key value request message to the server controller receiving, by the client controller, the flexible key value sent by the server controller.

8. A method, comprising:
   receiving, by a server controller, a control request sent by a client controller, wherein the control request comprises a plurality of configuration parameters, wherein the plurality of configuration parameters comprise a flexible key value, a control object name, and a universally unique identifier (UUID), wherein the flexible key value identifies a requested control object, and wherein the flexible key value is determined, using the control object name or the UUID, according to a type of the client controller, and wherein the type of value of the flexible key value indicates, to the server controller, the type of client controller that is a source of the control object and further indicates a configuration rule for the control object; and
   configuring the control object based on the flexible key value.

9. The method according to claim 8, wherein a field type of the flexible key value comprises at least a part of field types of the control object name and the UUID.

10. The method according to claim 8, wherein the configuring the control object based on the flexible key value comprises performing at least one of:
    determining, in response to the flexible key value being the same as a value of the control object name, that the flexible key value is the control object name, and configuring the control object according to a multi-domain service controller rule; or
    determining, in response to the flexible key value being consistent with a value of the UUID, that the flexible key value is the UUID, and configuring the control object according to a network management system rule.

11. The method according to claim 10, further comprising performing, before the receiving the control request, at least one of:
    determining, by the server controller through negotiation with a multi-domain service controller, to use the control object name as the flexible key value; and/or
    determining, by the server controller through negotiation with a network management device, to use the UUID as the flexible key value.

12. The method according to claim 11, further comprising performing, after the configuring the control object based on the flexible key value according to the multi-domain service controller rule, and in response to the multi-domain service controller having configured the UUID:
    forwarding, by the server controller, the UUID to the network management device.

13. The method according to claim 11, further comprising:
    performing configuration adjustment on the control request according to a query result of a query, according to the network management system rule, to determine the flexible key value; and performing, after the server controller performs the configuration adjustment, and in response to the multi-domain service controller having not configured the UUID:
    generating, by the server controller, a corresponding UUID value based on the control object name; and
    sending the corresponding UUID value to the network management device.

14. The method according to claim 8, further comprising performing, after the configuring the control object based on the flexible key value:
    sending, by the server controller, a response message to the client controller; and
    storing the plurality of configuration parameters in a same configuration database, wherein the response message indicates a configuration status of the control object.

15. The method according to claim 8, further comprising performing, before the receiving the control request sent by the client controller, at least one of:
    receiving a key value request message sent by the client controller; or
    sending the flexible key value to the client controller.

16. An apparatus, comprising:
    a transmitter;
    a processor; and
    a non-transitory computer readable medium having a computer program stored thereon, the computer program including instructions to:
        generate a control request, wherein the apparatus is applied to a client controller connected to a server controller, wherein the control request comprises a flexible key value, a control object name, and a universally unique identifier (UUID), the flexible key value is used to identify a requested control object, and the key value is determined, using the control object name or the UUID, according to a type of the client controller; and
        cause the transmitter to send the control request to the server controller, wherein the control request indicates to the server controller to configure the control object, and wherein the type of value of the flexible key value indicates, to the server controller, the type of client controller that is a source of the control object and further indicates a configuration rule for the control object.

17. The apparatus according to claim 16, wherein the computer program further includes instructions to:
    determine, through negotiation with the server controller, to use at least the control object name as the flexible key value; or determine, through negotiation with the server controller, to use the UUID as the flexible key value.

18. The apparatus according to claim 16, further comprising a receiver;
    wherein the computer program further includes instructions to cause the transmitter to send a key value request message to the server controller, wherein the key value request message is used to request to configure the flexible key value; and
    receive, through the receiver, the flexible key value sent by the server controller,
    receive, through the receiver, a response message sent by the server controller, wherein the response message indicates a configuration status of the control object.

19. A system, comprising:
    a client controller, comprising a first apparatus, the first apparatus comprising:
        a transmitter;
        a first processor; and
        a first non-transitory computer readable medium having a first computer program stored thereon, the first computer program including first instructions to:
            generate a control request, wherein the control request comprises a flexible key value, a control object name, and a universally unique identifier (UUID), wherein the flexible key value identifies a requested control object, and wherein the key value is determined, using the control object name or the UUID, according to a type of the client controller; and
            cause the transmitter to send the control request to a server controller, wherein the control request indicates to the server controller to configure the control object, and wherein the type of value of the flexible key value indicates, to the server controller, the type of client controller that is a source of the control object and further indicates a configuration rule for the control object; and
    the server controller, comprising a second apparatus, the second apparatus comprising:
        a receiver,
        a second processor; and
        a second non-transitory computer readable medium having a second computer program stored thereon, the second computer program including second instructions to:
            receive, through the receiver, a control request sent by the client controller;
            parse the control request; and
            configure the control object based on a plurality of configuration parameters obtained through parsing.

20. The system according to claim 19, wherein the first computer program further includes first instructions to determine, through negotiation with the server controller, to use at least one of the control object name or the UUID as the flexible key value.

* * * * *

UNITED STATES PATENT AND TRADEMARK OFFICE
CERTIFICATE OF CORRECTION

PATENT NO. : 12,323,293 B2
APPLICATION NO. : 17/889635
DATED : June 3, 2025
INVENTOR(S) : Zheng et al.

Page 1 of 1

It is certified that error appears in the above-identified patent and that said Letters Patent is hereby corrected as shown below:

In the Claims

In Column 19, in Claim 3, Line 45, delete "multi- domain" and insert -- multi-domain --.

In Column 19, in Claim 3, Lines 49-53, after "or" delete "configuring, by a network .......... value of the UUID." and insert the same from Line 50 as a new point/paragraph.

Signed and Sealed this
Eighth Day of July, 2025

Coke Morgan Stewart
*Acting Director of the United States Patent and Trademark Office*